United States Patent
Ahonen

(10) Patent No.: US 8,077,208 B2
(45) Date of Patent: Dec. 13, 2011

(54) METHOD, APPARATUS, SOFTWARE AND ARRANGEMENT FOR MODIFYING IMAGE DATA

(75) Inventor: Petri Ahonen, Jyväskylä (FI)

(73) Assignee: Nokia Corporation, Espoo (FI)

( * ) Notice: Subject to any disclaimer, the term of this patent is extended or adjusted under 35 U.S.C. 154(b) by 1121 days.

(21) Appl. No.: 11/667,572

(22) PCT Filed: Nov. 14, 2005

(86) PCT No.: PCT/EP2005/055938
§ 371 (c)(1),
(2), (4) Date: Sep. 17, 2007

(87) PCT Pub. No.: WO2006/053859
PCT Pub. Date: May 26, 2006

(65) Prior Publication Data
US 2008/0303912 A1     Dec. 11, 2008

(30) Foreign Application Priority Data
Nov. 18, 2004  (FI) ................................ 20045445

(51) Int. Cl.
H04N 5/225  (2006.01)
(52) U.S. Cl. .................... 348/207.99; 348/211.1
(58) Field of Classification Search ............. 348/211.1, 348/211.11, 207.99, 207.11
See application file for complete search history.

(56) References Cited

U.S. PATENT DOCUMENTS

| | | | | |
|---|---|---|---|---|
| 5,702,059 A * | 12/1997 | Chu et al. | ............... | 235/472.01 |
| 6,204,881 B1 | 3/2001 | Ikeda et al. | ............... | 348/362 |
| 6,330,027 B1 * | 12/2001 | Haba | ............... | 348/211.99 |
| 6,570,613 B1 | 5/2003 | Howell | ............... | 348/219.1 |
| 6,665,010 B1 * | 12/2003 | Morris et al. | ............... | 348/297 |
| 6,750,909 B1 * | 6/2004 | Tsai | ............... | 348/231.2 |
| 6,778,210 B1 * | 8/2004 | Sugahara et al. | ......... | 348/208.4 |
| 6,833,862 B1 * | 12/2004 | Li | ............... | 348/207.99 |
| 6,847,398 B1 * | 1/2005 | Fossum | ............... | 348/296 |
| 7,148,923 B2 * | 12/2006 | Harper et al. | ............... | 348/229.1 |
| 2002/0075389 A1 | 6/2002 | Seeger et al. | ............... | 348/222 |
| 2003/0095189 A1 | 5/2003 | Liu et al. | ............... | 348/208.4 |
| 2003/0151679 A1 | 8/2003 | Amerson et al. | ......... | 348/231.6 |
| 2004/0130649 A1 | 7/2004 | Lee | ............... | 348/345 |
| 2004/0201759 A1 | 10/2004 | Horiuchi | ............... | 348/254 |
| 2004/0239775 A1 | 12/2004 | Washisu | ............... | 348/239 |
| 2005/0104908 A1 * | 5/2005 | Brown Elliott | ......... | 345/694 |
| 2005/0168623 A1 | 8/2005 | Stavely et al. | ............... | 348/362 |
| 2007/0005443 A1 * | 1/2007 | Toshikage et al. | ......... | 705/26 |
| 2007/0229698 A1 * | 10/2007 | Kakinuma et al. | ......... | 348/362 |
| 2010/0238320 A1 * | 9/2010 | Washisu | ............... | 348/229.1 |

FOREIGN PATENT DOCUMENTS

| | | |
|---|---|---|
| EP | 1 067 778 A2 | 1/2001 |
| EP | 1 318 668 A2 | 6/2003 |
| KR | 2003-0097261 | 12/2003 |
| WO | WO 00/13407 | 3/2000 |

* cited by examiner

Primary Examiner — Hung Lam

(74) Attorney, Agent, or Firm — Harrington & Smith

(57) ABSTRACT

This invention relates to programmable modification of image data of a small compact digital camera. In the method according to the embodiments of the invention sensor data is processed before transferring it to an image processing component. The sensor data is read out from a camera sensor several times during one total exposure time and a data entity representing the final picture is integrated from the sensor data read out during an individual exposure time. The sensor data and/or the data entity are analyzed before the data entity is transferable to the image processing component.

29 Claims, 3 Drawing Sheets

METHOD, APPARATUS, SOFTWARE AND ARRANGEMENT FOR MODIFYING IMAGE DATA

TECHNICAL FIELD

This invention relates to programmable modification of image data of a small compact digital camera.

BACKGROUND

The quality of the picture taken with the camera is influenced by the properties of the camera and the optical system. The sensor of a digital camera has a certain resolution and certain characteristics, which define the quality of the image photographed. Among the optical features, the image angle, zoom and focal length influence the image quality particularly in small cameras, whose features cannot be infinitely improved due to the small device size. In addition, the optical system always introduces distortions. Some of the distortions are compensated by optical means, such as by installing an optical element of the opposite sign for correcting the distortion caused by the optical element. Optical distortions can also be compensated by taking into account characteristics of the objective, such as light distribution, in the image processing. Typically optical distortions are programmably corrected in digital cameras. The image quality is also essentially affected by the user's skills, as the user often selects certain parameters having a direct or an indirect effect on the image quality. In addition, for example waggling of the camera at the moment of taking the picture causes blurring in the final picture.

Optical systems can never be made completely distortionless. Therefore, achieving an acceptable level of image quality is generally aimed at. Correction of some of the distortions leads to an excessive increase in the total weight or costs of the device, for example, and is therefore not sensible. An acceptable image quality depends on the application, targets and purpose of use. For example, a different level of image quality is required from a professionally used camera compared to a small camera for general purpose, such as a camera installed in a mobile phone. Correction of the image quality is typically a compromise between the desired result, on one hand, and the costs and size of the device, on the other. Then again, the final image can today be further processed programmably for achieving the desired result.

SUMMARY

One object of the invention is to improve the image quality of a small compact digital camera. Another object of the invention is to diversify the features of a compact digital camera. One object of the invention is to compensate for the restrictions and boundary conditions that the camera apparatus sets for photographing.

The objects are achieved by reading out sensor data from the camera's sensor during an individual exposure time and by integrating the data entity representing the final image from the sensor data read out during the total exposure time such that the read out sensor data and/or integrated data entity are analyzed before transferring the data entity to the image processing component.

The invention is characterized in what is set forth in the characterizing parts of the independent claims. Other embodiments of the invention are described in the dependent claims.

In the method according to the embodiments of the invention, for processing the sensor data before transferring it to the image processing component, sensor data is read out from the camera's sensor during an individual exposure time and the data entity representing the final image is integrated from the sensor data read out during the total exposure time such that the read out sensor data and/or integrated data entity are analyzed before the data entity is transferable to the image processing component. In the embodiments of the invention the total exposure time is composed of individual exposure times and corresponds to the normal exposure time of modern cameras. An individual exposure time is used in this application to refer to the time at which the sensor is exposed before its data is read out. The individual data items read out during the total exposure time are integrated into a data entity representing the final image.

An apparatus according to the embodiments of the invention for processing sensor data before transferring it to the image processing component comprises means for reading out the sensor data of a camera sensor during an individual exposure time, means for analyzing the read out sensor data, means for integrating the data entity representing the final image from the sensor data read out during the total exposure time, and means for analyzing the data entity.

A software component according to the embodiments of the invention for processing sensor data before transferring it to the image processing component comprises programmable means for reading out the sensor data of a camera sensor several times during the total exposure time, programmable means for analyzing the read out sensor data, programmable means for integrating the data entity representing the final image from the sensor data read out during the total exposure time, and programmable means for analyzing the data entity.

Reading out the sensor data, typically several times, during the total exposure time according to one of the embodiments of the invention enables performing several analyses during the total exposure time. According to one embodiment, the exposure value is examined during the total exposure time. While examining the exposure value, a data entity is integrated or accumulated from the sensor data that is read out several times during the total exposure time, and this data entity is analyzed. If required, the sensor data can still be read after the total exposure time in case an optimum exposure value cannot be determined based on the existing data. The exposure value can thus change during the exposure. The expose can be adjusted pixel by pixel, or one and the same exposure value can be defined for the total sensor area. While according to the prior art technique the exposure value is measured before the exposure to be performed, according to the embodiments the exposure value is measured during individual exposure times, of which the total exposure time is composed, and the exposure value to be used is determined based on the individual exposure values measured during the total exposure time. According to the embodiments of the invention, advantages are achieved compared to the exposure value determination as per the prior art technique. If the amount of light increases during the sensor exposure, the picture to be composed according to the predefined exposure value becomes overexposed. According to one embodiment of the invention, in case saturation of pixels is detected during the total exposure time, exposure can be immediately stopped. In addition, according to some embodiments of the invention, it is possible to partly expose the view such that a longer exposure time is determined for darker areas than to lighter areas. Using the method according to the embodiments, a more accurate exposure value is achieved, being directly proportional to the momentary situations and conditions that occur during the individual exposure moments, of which the total exposure time is composed.

According to one embodiment, the movement detected by the motion sensor is taken into account during the exposure time while processing the sensor data. According to the prior art technique, it has been possible to compensate for the movement of stable (still) pictures only mechanically. According to one embodiment of the invention, the camera movement detected by the motion sensor causing blurring in the final picture can be compensated for during the total exposure time, based on the movement detected during the individual exposure time. Typically dots or pixels are shifted to the opposite direction for an amount corresponding to the movement detected by the motion sensor. The data is integrated into the data entity after the pixels have been shifted, so the data integrated into the data entity has been analyzed and corrected. Consequently, blurring caused by the movement in the final picture can be compensated, or it can be even completely eliminated already before processing the data entity with the image processing component. The detected movement also influences, according to one embodiment, the exposure value to be determined. In case the movement cannot be compensated, the exposure time can be interrupted, in which case the movement does not cause undesired blurring in the final picture.

According to one embodiment of the invention, the focusing distance, i.e. the focal length, is changed during the individual exposure time for focusing the image produced during the total exposure at various distances. Typically the focusing distances are determined based on the objects present in the image field such that the imaging optics is focused at the distance of each object. In this way it is possible to achieve an accurate, focused representation of all objects to be photographed in one field independent of their distance. The data entity according to the embodiment, integrated during the total exposure time, which represents the final picture to be composed, provides a picture, which is accurate at both close and remote distances. That is, both near and far objects are accurately imaged. Each area or object focused during an individual exposure time is integrated as part of the data entity to be accumulated during the total exposure time, of which the final picture is composed. The resolution of the final picture to be composed depends thus on the amount of memory, that is how accurately the data can be stored, rather than on the sensor resolution, as is the case in the systems according to the prior art technique. According to the prior art technique, the optics is focused at one given distance, which can be accurately and sharply imaged while the other distances are less accurately imaged. The focus length change during the total exposure time, according to the embodiments of the invention, can directly provide a picture that can conventionally be obtained for example by combining programmably several finished (final) pictures.

According to one embodiment of the invention, the image field to be photographed can be changed during the total exposure time. For example, a small movement or offset of the sensor or the whole camera from the original position results in shifting of the image field to be photographed. When reading out sensor data from several adjacent, partially overlapping image fields during the total exposure time, information is obtained from a larger field and with more accuracy compared to imaging only one stable image field during each individual exposure time. Compared to a stable image field, small offsets make the image field shift from a certain edge area or areas beyond the original image field. The edge areas thus provide extra information. Consequently, the data read out from the sensor during the total exposure time can provide a data entity, with the final picture created by means of this data entity covering a larger image field than would be achievable based on the sensor size. In addition, the center area of the picture is imaged and read out each time the sensor data is read out. Thus the center area provides more information and the final picture becomes more accurate. The data entity by means of which the final picture is composed can include more information related to the center area and the sensor resolution does not restrict the density of data in the center area. According to the embodiment of the invention, the resolution of the final picture depends rather on the memory and its capacity than on the sensor resolution, as is the case in conventional photographing devices.

According to another embodiment, the object or view to be photographed as well as its environment, can be stored, i.e. read out to the sensor by moving the camera. The view is as if scanned. This creates a focal length that is digitally smaller than actual, broadening the view angle. The size of the final read out picture (view angle) depends on the size of the image read out or scanned to the sensor. The size of the image to be scanned is naturally restricted by the amount of memory available for the data integration and storing and processing of the integrated data entity. Typically the exposed field is imaged on the camera display. The user can control such angle view widening by waggling the camera, which results in having a still larger image field imaged on the display. The user can move the camera to a direction that has not been exposed yet and in this way widen the view to be photographed to a desired direction.

The embodiments of the invention are particularly well adaptable to a very small compact camera device. While the camera needs to be as small as possible of its outer dimensions and thus physically compact, typically the amount of wiring should also be limited. Some camera devices are fitted with a so-called electric shutter, which hides the charges from the light-active part. These charges are, however, in analogue form, collecting thus noise from the environment. If the camera device is not equipped with a mechanical shutter, the reading speed of the sensor is limited by the outgoing bus. Typically the sensor output is connected to a read head by means of a serial bus, whereby the serial bus restricts the reading speed of the sensor. The reading speed of the sensor is typically of the order of 500 Mbit/sec. Reading a sensor of 5 Megapixels 10 bits per pixel gives the sensor reading speed of $1/10$ seconds. This sensor reading speed shows as great distortion in the final picture, if the object or the camera is moving, because the top row pixels are then at different levels compared to the bottom row pixels, since the object has moved over the distance of $1/10$ seconds. According to the embodiments of the invention, the sensor reading speed is not limited to the speed of the transfer bus, because the sensor is provided with a separate memory unit, which can be used during the individual exposure time for storing the read sensor data and integrating it into a data entity collected from the sensor data read out during the total exposure time. In this way each piece of sensor data read out during an individual exposure time can be stored irrespective of the data transfer speed. According to one embodiment of the invention, an electric shutter is formed in digital form.

According to another embodiment, a black object is imaged without light such that for example in the production the black object is read out to the memory as a reference picture. When pixel data is read out after this from the sensor, integrating it into this memory as a data entity, each piece of pixel data read out during an individual exposure time is compared to the reference picture. Using the reference picture it is possible to detect static noise and eliminate it, before integrating it into the data entity, from the data and thus also from the final picture.

According to a method according to one embodiment of the invention, a still picture can be taken during video imaging. Video image is composed of typically smoothly and continuously outgoing data in a method known as such. According to the embodiment of the invention, a data entity representing a still picture is also stored in the memory, into which the data entity is integrated, during the total exposure time. This data entity representing the still picture can be transferred to image processing for example when allowed by the capacity of the transfer bus.

BRIEF DESCRIPTION OF THE DRAWINGS

Advantageous embodiments of the invention are discussed below in more detail by making reference to the enclosed drawings, in which.

DETAILED DESCRIPTION

The various embodiments of the invention are described below by making reference to the enclosed drawings, which henceforth make a part of the description. The description sets forth some exemplifying embodiments in which the invention can be used and utilized. It is understood that other embodiments can also be utilized, and structural and functional modifications can be made in the embodiments without parting from the scope of protection of the invention.

Figure 1:
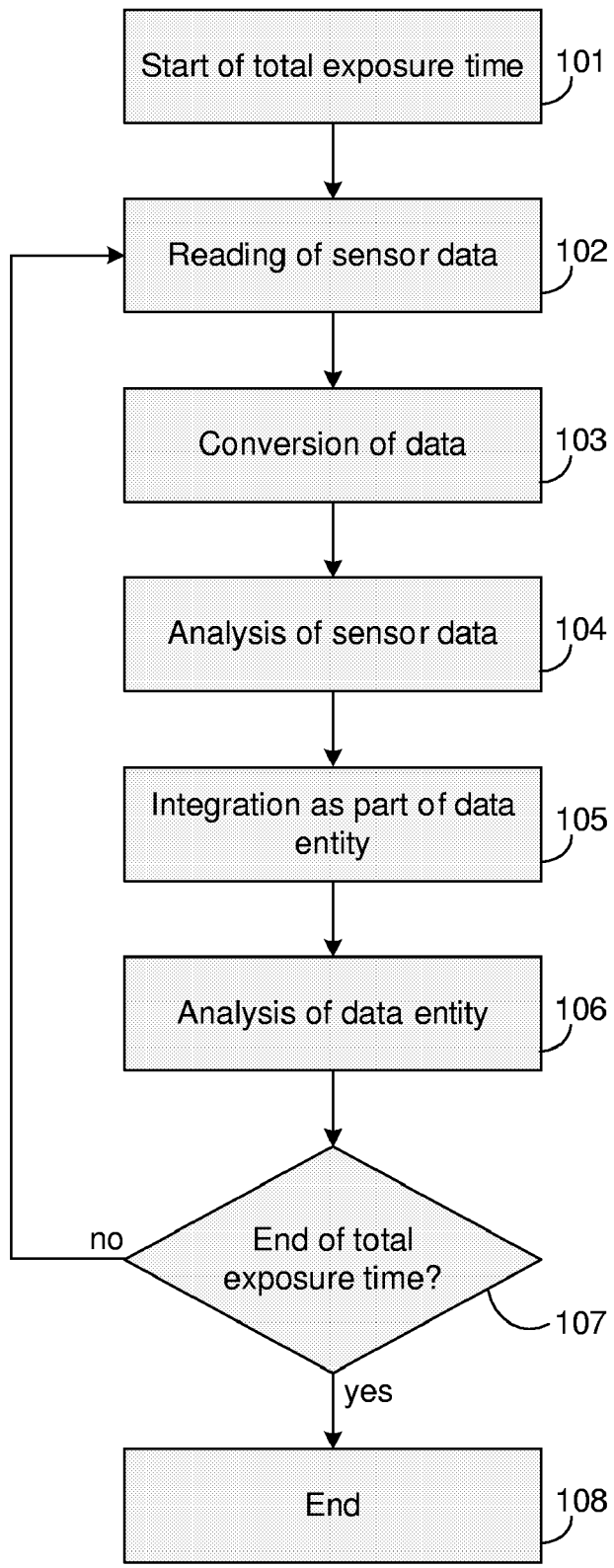
FIG. 1 illustrates a method according to one embodiment of the invention.

FIG. 1 shows a method according to one embodiment of the invention, which method is carried out during the total exposure time. The total exposure time starts in step 101. In this application text, the term individual exposure time is used to refer to the time during which the sensor's pixel is exposed and the photographing object is stored on the camera sensor. The total exposure time is composed of individual exposure times appearing during it and corresponds to the normal exposure time of a modern camera. The total exposure time is thus the time during which the shutter keeps open allowing light to access to the sensor. The longer the total exposure time, the more light can access the sensor and vice versa. On the other hand, the shorter the exposure time, the less the photographing object has time to move and thus cause blurring to the picture. The total exposure time is typically for example $1/25$ or $1/30$ seconds. According to one embodiment of the invention, the exposure value determining the exposure time can be changed based on the data collected during the total exposure time. The exposure time is not constant in the embodiment, but changes as the conditions change. The exposure value is used to determine the length of the exposure time, and the exposure time is typically determined proportionally to the focal distance.

In step 102 the sensor data is read out from the camera sensor during an individual exposure time. The sensor is read out frequently, for example at a frequency of $1/25000$ seconds. According to one embodiment of the invention, the sensor data is read out at a high frequency such that the ratio of frequencies of the total exposure time and individual exposure time, during which the sensor data is read out, is of the order of 1:10, 1:100, 1:1000 or 1:10000. The total exposure time can thus include individual exposure times of the order of 10, 100, 1000 or 10000. Sensor data can be read during an individual exposure time.

The sensor data read out in step 103 is converted to digital form. Typically the data is also amplified in this step. After this the data is in a processable form. According to one embodiment of the invention, the read out sensor data is converted to digital form before analyzing it in step 104. Step 104 involves an analysis of the sensor data read out from the sensor and converted to digital form. The analysis of sensor data can mean for example compensation of a detected movement for the sensor data before integrating the sensor data into the data entity in step 105. The data entity is composed of the sensor data read out from the camera sensor and collected during one total exposure time. According to one embodiment, the converted data can be processed before integrating it into the data entity according to step 104. For example, the data can be compared to certain limit values or to the data already existing in the data entity. Based on the comparison, it is then possible to select a certain portion of the data to be connected as part of the data entity. For example, when changing the focal distance, accurately imaged objects at this focal distance are stored from the data read out from the sensor during an individual exposure time. The focal distance is changed before the following individual exposure time so that various objects are accurately imaged. The final data then includes focusing information for various focusing distances according to the distance of each object in the image field. According to another embodiment, a data entity created additionally or alternatively and integrated from the sensor data is analyzed in step 106. The data entity can be a continuum composed of the data stored based on each piece of sensor data read out, including all data read out during the total exposure time. According to this embodiment, the data entity is analyzed and can be modified based on the analysis. According to one embodiment, the sensor data read out during one total exposure time is converted to digital form and integrated into one data entity, after which the integrated digital data entity is analyzed before transferring it to the image processing component. For example, the exposure time is typically adjusted by examining the data entity.

Once the data has been analyzed and possibly modified or certain parts of the data have been selected as parts of the data entity, it will be examined whether the total exposure time has run out or whether there is still total exposure time left in step 107. In case the total exposure time is still available, it is continued by reading out the following sensor data from the camera's sensor during some of the following individual exposure times according to step 102. If it is detected in step 107 that the total exposure time ends, then step 108 is accessed and the execution is ended. Typically, in step 108, a data entity has been created, which includes data processed according to the embodiments of the invention for composing a certain type of image. This processed data entity is typically transferred to the image processing component for creating the final picture. The data entity can be additionally or alternatively stored in the device memory from where it can be later retrieved for creating a picture.

Figure 2:
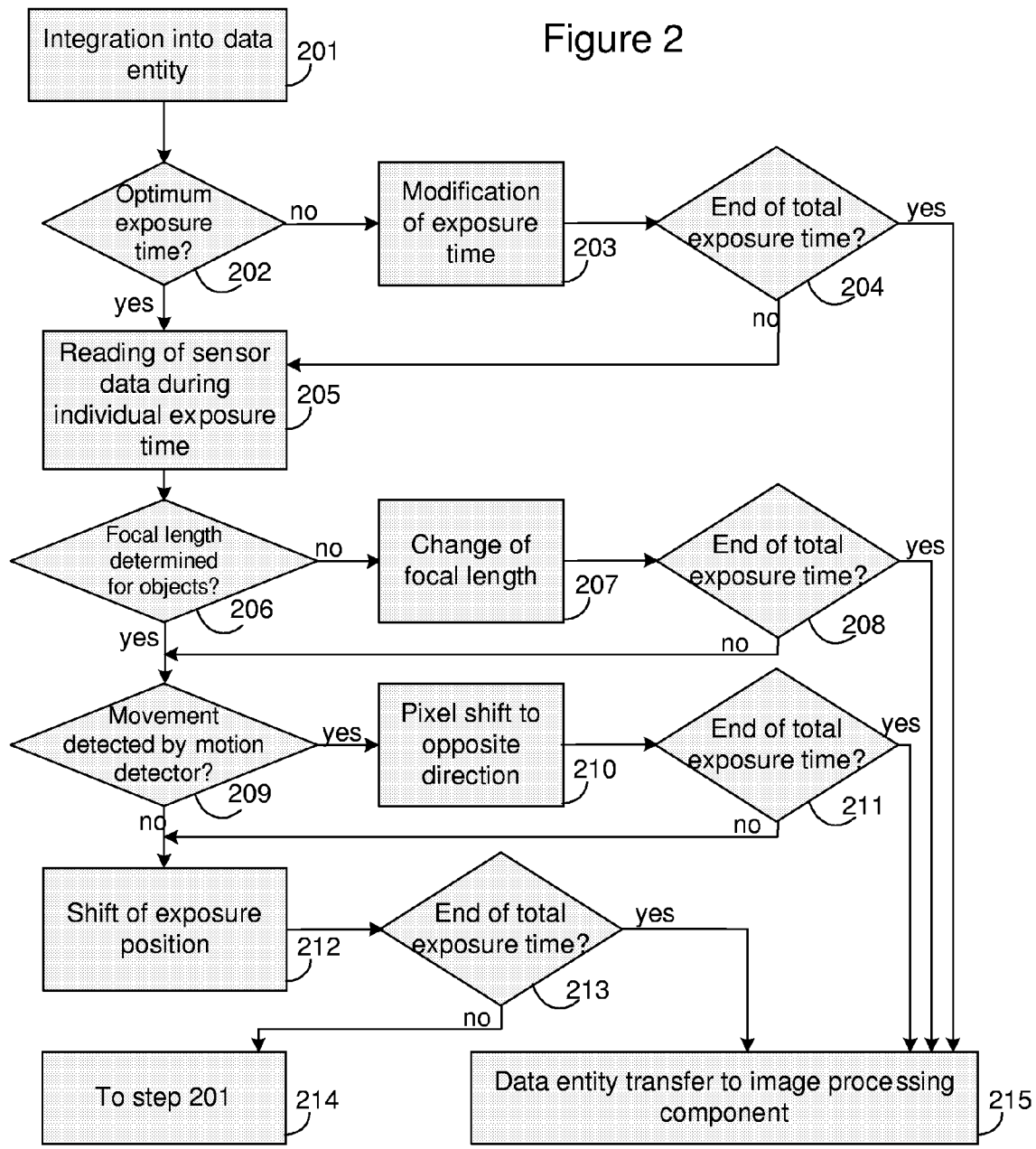
FIG. 2 shows an analyzing method according to one embodiment of the invention.

FIG. 2 shows an analysis step according to one embodiment, in which the sensor data read out from the camera sensor during an individual exposure time and/or a data entity composed thereof during the total exposure time is processed. The embodiment of FIG. 2 shows some processing steps, which can be carried out with an apparatus according to the embodiments of the invention. The processing steps may be carried out in a different order than shown here, or only some or one selected step thereof may be carried out. According to one embodiment of the invention, the sensor data is read out and processed during an individual exposure time. The read sensor data is stored in the memory unit of the camera for creating a data entity that represents the final picture. Stored data can be processed for example as shown in the embodiment of FIG. 2. In the embodiment of FIG. 2, in step 201, the pixel data is integrated into the data entity. The created data entity is examined in step 202 in the embodiment of FIG. 2. In case the examined exposure value is optimum based on the examination of step 202, the following step can be accessed. In case it is detected in step 202 that the exposure value is not the best possible, the exposure value is modified in step 203 according to certain predefined rules so as to achieve an optimum exposure value. In step 204 it is still possible to check if the total exposure time allocated for the data entity that is currently being collected has ended. In case the total exposure time has ended in step 204, step 215 is accessed, in which the created data entity is transferred to the image processing component for composing the final picture. According to one embodiment, the data entity is stored in step 215 on the device memory, from where it can be later retrieved to the image processing component for composing a picture. In case there is still total exposure time left in step 204, the following step 205 can be accessed. According to one embodiment, it is possible to examine only the exposure time according to steps 202-203. According to one embodiment of the invention, the data entity is analyzed during the total exposure time by examining the exposure adjustment and determining the exposure value based on the analysis made. According to one embodiment, exposure adjustment is examined uniformly over the whole sensor area. According to another embodiment, exposure can be adjusted pixel-specifically over the area of an individual pixel. According to one embodiment, exposure can be examined over the area of certain selected pixels, in a so-called block-specific manner.

In step 205 sensor data is read out from the camera sensor during an individual exposure time. In step 206 it is examined whether the focal distance has been determined for the various objects located in the view to be photographed. According to one embodiment of the invention, the focal distance and object are alternated during the total exposure time so as to achieve focal information for various distances. Typically the focal distances or focal lengths for the individual exposure times are so selected that each object in the image field is clearly imaged; that is, the focal distances correspond to the object distances. Focusing is not typically made on the distances without an object, because an accurate image is not required for achieving an accurate picture from an objectless distance. On the contrary, focusing on an objectless distance normally only spends the capacity of the apparatus without producing any essential additional information. In step 206 it is examined whether the focal distance has already been determined for all objects located at various distances of the view to be photographed during the total exposure time. In case any distance of any object is still unexamined, the focal distance is changed in step 207. Typically the focal distance is zoomed to the next nearest object, for example from the closest object to the farthest. According to one embodiment, the focal distance is increased with certain steps so that when an object at this distance is detected in the view to be photographed, focusing is made on this distance. According to one embodiment, the camera aperture is adjusted during the total exposure time. The amount of light on the sensor can be adjusted by means of the aperture. At the same time, the aperture adjustment influences the depth of field of the final picture. Consequently, photographing of objects at various distances can also be made accurately according to the embodiment of the invention by adjusting the aperture. According to one embodiment of the invention, the focusing information of each object in the final picture is included in the data entity to be transferred to the image processing component, whereby each object is accurately photographed irrespective of the object distance. In step 208 it is examined whether the total exposure time has ended. In case the total exposure time, consisting of the individual exposure times, is spent, step 215 is accessed, in which the created data entity is transferred to the image processing component. According to one embodiment, only the focal distance examination and a possible change is performed for the read sensor data, after which, in case it is detected in step 208 that the total exposure time concerned is still left, the sensor data is read out once again according to step 205. In the embodiment of FIG. 2, step 209 is accessed provided that there is still total exposure time left in step 208.

In step 209 it is examined whether movement has been detected in the camera or in the photographing object during an individual exposure time. The motion sensor, which can be a physical sensor or for example a motion estimator, can transmit information on the detected movement to a processing component according to the invention, or the processing component can for example check at certain intervals whether the motion sensor has detected a movement. Generally the motion sensor indicates a detected movement for example by transmitting a signal to the processing block. According to one embodiment of the invention, in case the motion sensor indicates a movement of the camera/object during an individual exposure time, the pixel data read out from the sensor during this individual exposure time is moved to a direction opposite to the indicated movement for eliminating blurring caused by the movement from the final picture. In case a movement has been detected in step 209, step 210 is accessed, in which the pixel data is so shifted that this shifting compensates the movement detected in step 209. Pixel data is thus shifted for an amount corresponding to the detected movement, to the opposite direction. After this the movement-compensated pixel data is integrated into the data entity representing the final picture. According to one embodiment, an undesired movement of the camera or object, which would normally cause blurring in the final picture, can be compensated. According to one embodiment, blurring caused by the camera movement can be completely eliminated from the final picture. In step 211 it is examined whether there is any total exposure time left. In case the total exposure time is out, step 215 is accessed, in which the created data entity is transferred to the image processing component. According to one embodiment, the data entity can still be processed, for example, certain stored data can be selected on certain predefined grounds as part of the data entity before transferring it to the image processing component according to step 215. In case there is still total exposure time left in step 211, the following step is accessed. The following step can be, depending on the embodiment, moving to step 201 according to step 214, in which the analyzed data is integrated into the data entity, or, as shown in FIG. 2, shifting of the exposure position according to step 212.

In step 212, the position of the view imaged on the sensor, i.e. the view to be exposed, is offset. In practice, this offset can be achieved for example by changing the focal distance, which also broadens or narrows the view angle correspondingly. According to one embodiment, the change of the exposed view is examined simultaneously with the examination of the focal distance, as these variables are interdependent and can thus be modified at the same time. According to one embodiment of the invention, a small offset is produced in the sensor, optical system or photographing apparatus during an individual exposure time so that a larger image field is exposed during the total exposure time than the one corresponding to the sensor size. Offsets according to the embodiments and deviations caused by them in the view are very small, the magnitude scale being typically in micrometers. The pixel size of the sensor is typically of the order of 2-10 micrometers or even below 2 micrometers. By changing the focal length additional information is obtained over a much larger image field. According to one embodiment, the image object moves over the sensor area, whereby the sensor as if scans the image object during the total exposure time. Such a large object can also be read out with a small sensor. According to the embodiment of the invention, the data entity integrated from the read sensor data during the total exposure time includes more detailed information on the center area common to the various offset positions and additional information on the edge area specific to each offset position. According to one embodiment, the center area of the view to be photographed is common area for each of the view angles deviating slightly from one another. According to the embodiment, a lot of data is received from the center area, a higher amount and more accurately than if the sensor were read out only over the stable view. Thus the center area of the view can be very accurately photographed, because, according to the embodiments, the center area provides more data than could be otherwise received according to the boundary conditions set by the sensor resolution. According to one embodiment of the invention, a data entity is integrated from the information, concerning the sensor center area, common to the sensor data read out during the total exposure time, for forming an image whose resolution is higher than the sensor resolution. The direction of the offset, i.e. the shifting direction of the view to be photographed, determines which edge area or edge areas remain covered compared to the previous view and which in turn appear as new. When changing the focal distance, the edge areas typically expand or contract peripherally to the same extent in all directions. Data coming from the newly appearing edge areas is such that has not been earlier received to the sensor. In this way, in addition to the previous data, completely new data can be read out from the sensor, and the new data can be attached to the data entity created within the total exposure time. Thus the size of the photographed view is not restricted to the sensor size, but it is possible to photograph a wider view than would be defined by the sensor size. According to one embodiment of the invention, individual sensor data read out during the total exposure time is integrated into a data entity for forming an image that includes a wider image field than the normal image field of the sensor.

In step 213 it is again examined whether the total exposure time has ended. If there is still total exposure time left in step 213, step 201 is accessed according to step 214, in which the data is integrated into the data entity. If the total exposure time is out in step 213, the created data entity is transferred to the image processing component in step 215. According to one embodiment, the data entity can be collected from the stored data or it can still be modified before transferring the data entity to the image processing component according to step 215. The analysis steps shown in the embodiment of FIG. 2 can be performed in a different order or one or some of them can be excluded depending on the application. According to one embodiment, the movement detected for example in step 209 by the motion sensor causes, besides compensation of the movement shown in the embodiment of FIG. 2 by shifting the dots or pixels, also checking of the exposure value and possible changes in the exposure value.

Figure 3:
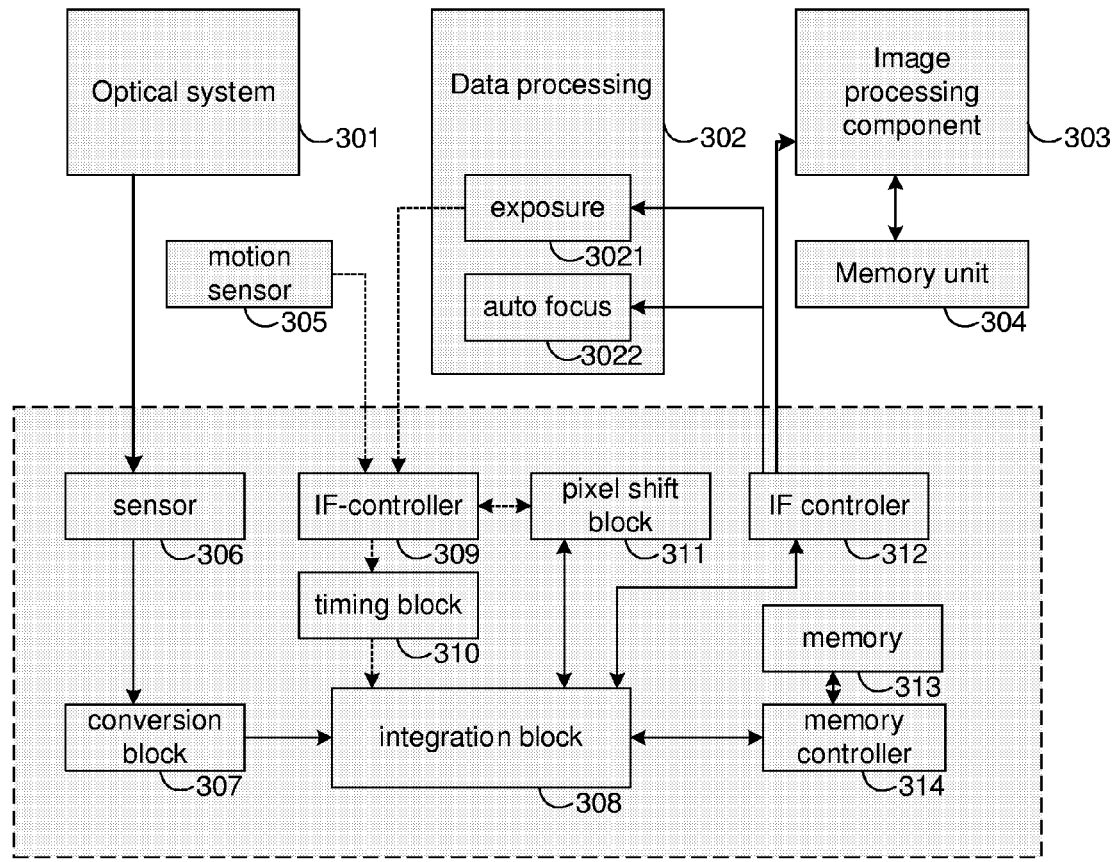
FIG. 3 illustrates an apparatus according to one embodiment of the invention.

An exemplifying apparatus according to one embodiment comprises an optical system 301, a data processing block 302, and an image processing component illustrated in FIG. 3. The optical system 301 comprises optics, i.e. the lens system. The optical system 301 may also comprise an actuator for starting the imaging process. The data processing block 302 typically comprises an exposure block 3021, in which the exposure value is defined. The exposure value is affected by the exposure time and the adjustment of dimming of the lens system, i.e. the size of the opening. Typically the exposure value is automatically determined in the exposure block 3021. In some most advanced devices the parameters affecting the exposure value can also be manually adjusted. The data processing block 302 typically also comprises an auto focus block 3022, that is a block, in which the focal distance on which focusing is made, is automatically determined. According to the prior art technique, data is transmitted from the data processing block 302 to the image processing component 303 for creating a digital image file. The image file can be shown on the display unit of the device and stored on a memory card, for example, or in a similar memory unit 304 of the device. According to some embodiments of the invention, the sensor data read out from the sensor 306 is processed before transferring the sensor data to the image processing component 303. The blocks according to some of the embodiments of the invention are represented in FIG. 3 in the area defined with broken lines.

In the apparatus according to the embodiments of the invention, the data read out from the sensor is processed before transferring the data to the image processing component 303. An apparatus according to one embodiment of the invention for processing sensor data before transferring it to the image processing component 303 comprises means for reading out the sensor data of the camera sensor 306 at least two or more times during one total exposure time, means for analyzing the read sensor data 309, means for integrating 308 the data entity representing the final image from the sensor data read out during the total exposure time, and means for analyzing the data entity 312.

The exposure time determined in the exposure block 3021 is typically of the order of ⅕s seconds, for example. The sensor 306 is read out several times during the specified total exposure time, for example 25000 times per second. According to some embodiments, the apparatus according to the invention comprises means for reading out the sensor data of the order of 10, 100, 1000 or 10000 times during one total exposure time. Typically the number of individual exposure times, during which the sensor is exposed and which make up the total exposure time, is equal to the number of reading times of the sensor. The ratio between the total exposure time and an individual exposure time can thus be of the order of 1:10, 1:100, 1:1000 or 1:10000.

An apparatus according to one embodiment comprises means 307 for converting the read out sensor data into digital form. The data in digital form can then be processed, modified and stored. A data entity representing the final picture to be composed is integrated from the converted digital data in the integration block 308. A photographing apparatus according to one embodiment comprises means for analyzing the digital data entity created from the sensor data 312. The created digital data entity can be analyzed and modified before transferring it to the image processing component 303. The exposure value or focal length, for example, can be adjusted.

A photographing apparatus according to one embodiment of the invention comprises a motion sensor 305 for indicating the camera movement and means for shifting the pixel data 311 read out from the sensor to a direction opposite to the indicated camera movement for eliminating blurring caused by the movement from the data entity in the final picture to be composed. The pixel shifting block 311 determines how, how much and on what conditions the pixels of the image or dots are shifted. Typically the pixels are shifted by means of the pixel shifting block 311 for compensating for undesired blurring of the image, in case the motion sensor 305 indicates a camera movement. The motion sensor 305 can be read out at given intervals or the motion sensor 305 can convey information on the camera movement when detecting it. Besides being a physical sensor, the motion sensor can be for example a motion estimator, which detects a global movement by comparing individual pixel data read out from the sensor to a previously integrated data entity. Information on the camera movement is transmitted to an IF controller, which is typically a serial IF port 309. In case the IF controller 309 receives information on the camera movement, it can convey the movement information to the pixel shifting block 311, in which the pixel is shifted according to certain specified instructions. Typically the camera movement is compensated such that pixel data or dot data is shifted for an extent corresponding to the movement to a direction opposite to the movement. The effect of the movement of the camera or the photographed object on the final picture can be completely eliminated with an apparatus according to one embodiment of the invention. Typically, notable blurring, at least, in the final picture can be compensated and a so-called sufficiently good image can be obtained. The movement-compensated, corrected pixel data is integrated into the data entity.

The serial IF controller 309 also receives information on the exposure value determined in the exposure block 3021. The IF controller 309 conveys the exposure value to the timing block 310, in which the specified exposure value and the parameters related thereto can be analyzed and modified. A movement detected by the motion sensor 305 can also affect the modification of the exposure value. A photographing apparatus according to one embodiment of the invention comprises means 310 for examining the exposure adjustment of the sensor data and for determining the exposure time based on the examination during the exposure stage. According to one embodiment, the photographing apparatus comprises means 310 for examining exposure adjustment over the entire sensor area, sensor-specifically. According to another embodiment, the photographing apparatus comprises means 310 for examining exposure adjustment over an area of an individual pixel, pixel-specifically. According to a third embodiment, the photographing apparatus comprises means 310 for examining exposure adjustment over the area of certain pixels, one block containing certain pixels at a time. The new specified exposure value is conveyed via the IF controller 312 to the exposure block 3021 of the data processing block 302, in which the new exposure value is taken into use. According to one embodiment, a new value can also be similarly determined for the focal length, in which case the new focal length value is transmitted alternatively or in addition to the new exposure value to the data processing block 302, and the new value is taken into use.

An apparatus according to one embodiment of the invention comprises means for varying the focal length and object during the total exposure time for creating focal information for the various distances. According to one embodiment, the serial IF controller 312 conveys information on the focal length to the auto focus block 3022 of the data processing block 302. The new focal length information received according to one embodiment of the invention is taken into use in the data processing block 302, which information is used during the following individual exposure time. According to one embodiment the following sensor data is read out during the following individual exposure time in accordance with the new received focal length value, during its validity. In this way it is possible to obtain images focused on various distances. According to another embodiment, objects at various distances can be accurately photographed by adjusting the aperture during the total exposure time. An apparatus according to one embodiment comprises means for including the focusing information of each object in the final picture in the data entity to be transferred to the image processing component for photographing each object accurately irrespective of the distance. It is thus possible to achieve accurate photographing of all objects located at various distances irrespective of their distances. Information on all objects or areas, focused at various distances are integrated in the integration block 308 into the data entity, which represents the final picture exposed within the total exposure time.

An apparatus according to one embodiment comprises means for scanning the image field exposed at each time and for creating a data entity that can be used to compose an integral final picture by means of an image processing component external to the camera. This embodiment enables for the user scanning a wider image field than that of the camera by moving the camera during photographing.

An apparatus according to one embodiment of the invention comprises means for producing a minimum offset in the sensor or photographing apparatus during an individual exposure time for exposing a wider image field than that corresponding to the sensor size during the total exposure time. Typically the sensor or photographing apparatus is offset from its original position. The offset is typically micrometers in magnitude, that is less than the sensor dot size. This allows reading out a few adjacent frames from the sensor during the total exposure time. The information of all read frames can be integrated in the integration block 308 into the data entity, which represents the final picture composed during the total exposure time. An apparatus according to one embodiment comprises means for integrating the sensor data read out during the total exposure time into a data entity 308 for composing a picture that includes a wider image field than the normal image field of the sensor. An apparatus according to another embodiment comprises means for integrating the information, concerning the sensor center area, common to the sensor data read out during the total exposure time, into a data entity 308 for composing a picture whose resolution is higher than the sensor resolution. The arrangement according to the embodiment thus provides detailed additional information on the center parts of the image and/or extra additional information on the edge parts of the image. According to one embodiment, the integration block 308 stores data in a memory unit 313 and processes the data stored in the memory unit 313. The memory unit 313 of the camera is typically a read-alter memory and it is processed via the memory controller 312.

The means according to the embodiments of the invention are typically, at least partly, programmable means. According to one embodiment, the camera sensor is equipped with a physical external memory unit for expanding the memory and with physical pixel shifting and pixel data integration means, which can be implemented with silicon embedded logic, for example. A software component according to one embodiment of the invention for processing the sensor data before transferring it to the image processing component comprises programmable means for reading out the sensor data of a camera at least two or more times during the total exposure time, programmable means for analyzing the read out sensor data, and programmable means for integrating the data entity representing the final image from the sensor data read out during the total exposure time. A serial IF controller according to one embodiment comprises means for analyzing and processing the data in a specified manner. A timing block according to one embodiment comprises means for determining the exposure value or the parameters affecting it, such as exposure time or size of the opening, based on certain conditions. A pixel shifting block according to one embodiment comprises programmable means for shifting dots or pixels, that is typically pixel data read out from the sensor, to a certain extent, to a certain direction, under certain predefined conditions. A programmable means is typically executable software, a code in a computer language or an instruction set for executing certain action under certain predefined conditions. Typically at least part of the means for carrying out the method according to the embodiments of the invention are programmable means.

Figure 4:
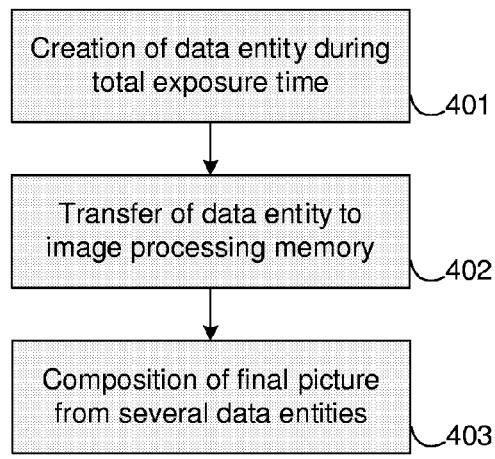
FIG. 4 shows a method according to one embodiment of the invention for combining data entities for forming the final picture outside the camera apparatus.

FIG. 4 shows an embodiment, in which the user can create, according to the embodiments of the invention, data entities, which are integrated into a continuous image outside the camera apparatus. Thus the memory of the camera apparatus does not restrict the size of the final image. A data entity is created in step 401 during the total exposure time according to the embodiments of the invention. The data entity can be, for example movement-compensated or it may comprise focusing information for the objects of the view to be photographed located at different distances. According to one embodiment, the data entities created in this way include an indication of that the data entity is a part of a larger, wider so-called panoramic image, for example, which is composed of several equivalent data entities. The data entity is transferred to the image processing memory in step 402. The image entity accumulated in the image processing memory is displayed in real-time to allow the user to control the accumulation. The image processing memory is typically a memory unit external to the camera apparatus. Also the display unit which displays the thus far accumulated data entities in real-time, is typically a display external to the camera apparatus. According to one embodiment, the display unit of the camera apparatus displays the accumulated data entities as drafts that do not include all data contained in the data entities, but are however identifiable. With the data amount remaining reasonable, the draft can be shown in real-time on the display of the camera apparatus. According to one embodiment, the image processing memory is a special memory unit for storing data entities. The image processing memory typically also includes a processing block, by means of which the data entities in the image processing memory are integrated for composing the final picture.

In step 403 the final picture is composed from the plurality of data entities. In step 403, according to one embodiment, it is possible to examine the common features of the data entities for finding overlapping or adjacent data entities. Step 403 is carried out in this embodiment outside the camera apparatus, such that the memory amount of the camera apparatus does not restrict the accomplishment. The embodiment shown in FIG. 4 enables for the user to photograph a desired object or view piece by piece. The user as if scans the total view one part at a time. After one part of the object or the view is photographed and a data entity is created thereof, which data entity is transferred to the external memory unit, the user shifts the camera such that the next part of the object or view can be exposed for creating a data entity. According to one embodiment, the data entities include an indication of being a part of an image to be composed of several data entities.

According to another embodiment, the external processing unit, based on certain rules, knows how to integrate the final picture from certain data entities. The final picture can be composed, for example, of data entities that have been produced one after another, at certain intervals of time. When the interval between the creation or storing of two data entities exceeds a specified limit value, the data entities are no more counted in as belonging to the same final picture.

The invention claimed is:

1. A method, comprising:
reading out sensor data from a camera sensor during an individual exposure time of a total exposure time; and
integrating a data entity representing a final picture from the sensor data read out during the total exposure time such that at least one of the read sensor data and the integrated data entity is analyzed before the data entity is transferred to an image processing component, where a focus distance is automatically changed for at least two individual exposure times to clearly focus at least two objects at different focal distances in an image field of the camera sensor, and where focus information for each of the at least two objects is included in the data entity.

2. A method according to claim 1, where the sensor data is read out at a high frequency at least two times during the total exposure time.

3. A method according to claim 1, where the sensor data is read out at a high frequency such that the ratio of frequencies of the total exposure time and an individual exposure time, during which the sensor data is read, is of the order of 1:10, 1:100, 1:1000 or 1:10000.

4. A method according to claim 1, where the sensor data read out during the total exposure time is converted to digital form and integrated into one data entity, after which the integrated, digital data entity is analyzed before transferring it to the image processing component.

5. A method according to claim 1, where during the total exposure time the data entity is analyzed such that an exposure adjustment is analyzed and the exposure time is determined based on the analysis performed.

6. A method according to claim 5, where the exposure adjustment is analyzed over an area of one of an entire camera sensor, an individual pixel or specified pixels.

7. A method according to claim 1, where the read sensor data is converted to digital form and the digital sensor data is analyzed before the sensor data is integrated into the data entity.

8. A method according to claim 1, where the data entity is a digital data entity and where during the total exposure time, in a case where a motion sensor indicates a camera movement, the digital data entity is shifted to a direction opposite to the indicated camera movement for eliminating blurring in the final picture caused by the movement.

9. A method according to claim 1, where the focus information for each of the at least two objects is integrated as part of the data entity to be accumulated during the total exposure time.

10. A method according to claim 1, where the focus information for each of the at least two objects is included in the data entity such that each of the at least two objects is accurately photographed irrespective of an object distance.

11. A method according to claim 1, where the image field is corresponding to a size of the sensor, and where during the total exposure time an offset is caused in the sensor or in a photographing apparatus such that a larger image field is exposed during the total exposure time than the image field corresponding to the sensor size.

12. A method according to claim 11, where the read sensor data includes more detailed information on a center area common to various offset positions and additional information on an edge area specific to each offset position.

13. A method according to claim 11, where the sensor data read out during the total exposure time is integrated into the data entity for composing a picture that includes a wider image field than a normal image field of the sensor.

14. A method according to claim 11, where the data entity is integrated from information, concerning a sensor center area, common to the sensor data read out during the total exposure time, for composing a picture whose resolution is higher than the sensor resolution.

15. A method according to claim 1, where the data entity produced during the total exposure time is transferred to an external memory, in which the final picture is composed of at least two or more data entities by integrating the data entities into an integrated picture.

16. An apparatus comprising:
at least one data processor; and
at least one memory including software, where the at least one memory and the software are configured, with the at least one data processor, to cause the apparatus to at least:
read out sensor data of a camera sensor during an individual exposure time of a total exposure time,
analyze the read sensor data,
integrate a data entity representing a final picture from the sensor data read out during the total exposure time, and
analyze the data entity before the data entity is transferred to an image processing component, where a focus distance is automatically changed for at least two individual exposure times to clearly focus at least two objects at different focal distances in an image field of the camera sensor, and where focus information for each of the at least two objects is included in the data entity.

17. An apparatus according to claim 16, where the sensor data is read out at least two or more times during the total exposure time.

18. An apparatus according to claim 16, where the sensor data is read out one of 10, 100, 1000 or 10000 times during the total exposure time.

19. An apparatus according to claim 16, comprising the at least one memory including software are configured, with the at least one data processor, to cause the apparatus to convert the read sensor data to digital form,
analyze the digital sensor data, and
integrate the analyzed digital sensor data into the data entity.

20. An apparatus according to claim 16, comprising the at least one memory including software are configured, with the at least one data processor, to cause the apparatus to sense a movement of the camera,
shift the digital data entity to a direction opposite to the camera movement, and
eliminate blurring caused by the movement from the final picture to be composed of the data entity.

21. An apparatus according to claim 19, it comprising means for analyzing the digital data entity created out of the sensor data.

22. An apparatus according to claim 16, comprising the at least one memory including software are configured, with the at least one data processor, to cause the apparatus to examine exposure adjustment of the sensor data, and
determine the exposure value by analyzing the data entity during the total exposure time.

23. An apparatus according to claim 21, comprising the at least one memory including software are configured, with the at least one data processor, to cause the apparatus to examine exposure adjustment over the entire sensor area, over the area of an individual pixel or over an area of specified pixels.

24. An apparatus according to claim 16, where the focus information for each of the at least two objects is integrated as part of the data entity to be accumulated during the total exposure time.

25. An apparatus according to claim 16, where the focus information for each of the at least two objects is included in the data entity such that each of the at least two objects is accurately photographed irrespective of an object distance.

26. An apparatus according to claim 16, comprising the at least one memory including software are configured, with the at least one data processor, to cause the apparatus to cause a sway in the sensor or in the photographing apparatus during the total exposure time for exposing a larger image field than the one corresponding to the sensor size during the total exposure time.

27. An apparatus according to claim 25, comprising the at least one memory including software are configured, with the at least one data processor, to cause the apparatus to integrate the sensor data read out during the total exposure time into a data entity for composing a picture that includes a wider image field than the normal image field of the sensor.

28. An apparatus according to claim 25, comprising the at least one memory including software are configured, with the at least one data processor, to cause the apparatus to integrate the information, concerning the sensor center area, common to the sensor data read out during the total exposure time, into a data entity for composing a picture whose resolution is higher than the sensor resolution.

29. A non-transitory memory embodying software, the software executed to carry out the method according to claim 1.

* * * * *